United States Patent [19]

Danquechin Dorval

[11] 3,899,106

[45] Aug. 12, 1975

[54] LIQUID METERING DEVICE

[76] Inventor: Edmond Danquechin Dorval, 4, avenue des Arts, Versailles (78) Yvelines, France

[22] Filed: Feb. 3, 1971

[21] Appl. No.: 112,261

[30] Foreign Application Priority Data

Feb. 16, 1970 France .............................. 70.05353

[52] U.S. Cl. ................. 222/177; 137/115; 137/566
[51] Int. Cl. ............................................ A01c 23/00
[58] Field of Search ........ 222/71, 72, 177; 137/115, 137/566; 111/6, 7

[56] References Cited
UNITED STATES PATENTS

| 2,965,119 | 12/1960 | Hawkinson ..................... 137/566 X |
| 2,975,940 | 3/1961 | Nybakke ............................. 222/177 |

FOREIGN PATENTS OR APPLICATIONS

| 1,382,919 | 3/1963 | France ................................... 111/7 |

Primary Examiner—Robert B. Reeves
Assistant Examiner—Thomas E. Kocovsky
Attorney, Agent, or Firm—Toren, McGeady and Stanger

[57] ABSTRACT

The liquid metering device serves to maintain constant the volume of liquid distributed per unit area. The device comprises a quantity regulator driven by a ground engaging wheel for drawing liquid from a reservoir, and supplying it to an outlet via a high pressure pump driven by a power take-off of an auxiliary motor or of the tractor which is used to tow the distributor vehicle. Connected in parallel with the high pressure pump is a regulating return valve controlled by a pressure sensitive device cooperating with the conduit joining the quantity regulator and the high pressure pump. With such an arrangement the delivery through the regulating return valve increases or decreases in response to a decreasing or an increasing respectively in pressure in the conduit which in turn is dependant upon the quantity of liquid actually distributed through said outlet and upon the delivery of the quantity regulator.

7 Claims, 2 Drawing Figures

LIQUID METERING DEVICE

BACKGROUND TO THE INVENTION

The present invention relates to a liquid metering device and particularly but not solely concerns the distribution of liquid, especially on the ground for agricultural work.

The distribution of treatment liquids or liquid fertilisers over the ground can be effected by the use of pumps working at constant pressure. In the case of variation of the speed of travel, the distributed volume per unit of area also varies, which may well be harmful; manual adjustment corrections are difficult and inaccurate. Thus it is frequently preferred to drive a piston pump by a wheel bearing upon the ground, which ensures the distribution of a constant volume per unit area, at variable speed of travel.

However, this simple process does not permit a significant increase of pressure since beyond a certain absorbed power the wheel skids on the ground.

SUMMARY OF THE INVENTION

According to the invention there is provided a device for the controlled metering of liquid from a reservoir comprising a circuit, including:
a. A first variable delivery pump operating at low pressure adapted to drain liquid from said reservoir and to deliver the quantity of liquid to be distributed,
b. an outlet for said liquid,
c. a second pump operating at high pressure connected between the first pump and said outlet,
d. a regulating return valve connected in parallel with said second pump, and
e. a pressure sensitive device connected between the first pump and the parallel connection of the second pump and the regulating valve, said pressure sensitive device being coupled to regulating return valve to control the latter whereby the return part of the second pump delivery through said valve increases or decreases in response to a decreasing or an increasing in pressure in the circuit, said pressure being in turn dependant upon the quantity of liquid actually distributed through said outlet and upon the delivery of the first pump. In this manner the device maintains a low pressure between the first pump and the second pump in such manner as to avoid on the one hand the absorption of excessive power by the first pump, and on the other hand the suction of the liquid by the second pump through the first pump.

DESCRIPTION OF PREFERRED EMBODIMENT

In the embodiment shown, a non driving wheel A bearing upon the ground S drives through a chain or belt, a disc B pierced with holes J. In one of these, the eccentricity of which is selected as a function of the desired volume per unit of area to be distributed, a pin L of a connecting rod M driving the piston of a first pump C is passed.

This first pump draws the liquid from a reservoir D through one of two conduits N and delivers it at low pressure through conduits P towards an air reservoir E then towards a regulator F, having delayed for undelayed action, and the suction side Q of a pressure pump H operated by a power take-off represented diagrammatically at I. This power take-off is generally that of the tractor which moves the distributor vehicle or that of an auxiliary motor. It should be noted that as the first pump C, operating as a quantity regulator, works at low pressure, it exerts a weak braking action upon the wheel A, avoiding any skidding. The delivery of the pump C is proportional to the angular speed of the wheel A, and therefore to the displacement speed of the vehicle. The choice of the appropriate hole J thus permits to the pump C to have at any time a delivery corresponding to that to be distributed, irrespective of the displacement speed of the vehicle.

The delivery R leads to distributor elements K represented by way of example as a spraying boom.

In parallel with the pump H is mounted a valve G the closure element $G_1$ of which is controlled by the regulator F through a connection represented diagrammatically at T. This connection, which is mechanical for example, is arranged so that an increase or a decrease of pressure, and therefore of volume, in the circuit of the regulator F causes a decrease or an increase respectively of the return part of the delivery of the pump H passing through the valve G.

Figure 1:
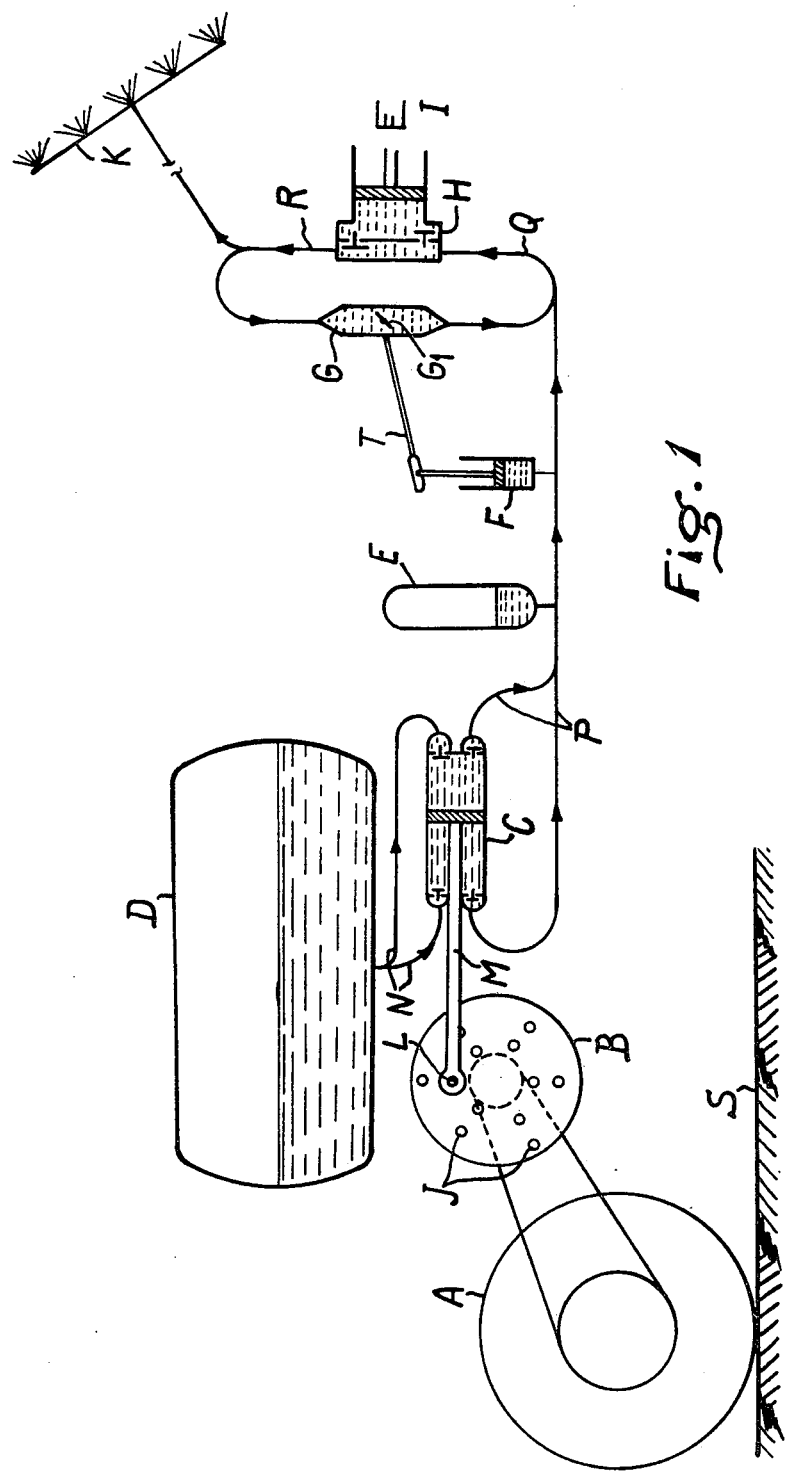
FIG. 1 is a diagramatic layout of a circuit for controlling metering of liquid in accordance with the present invention.
Figure 2:
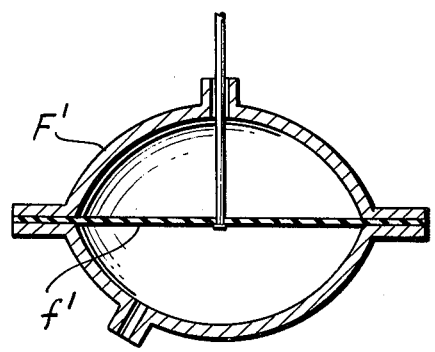
FIG. 2 is a cross-sectional view of an alternative regulator for the arrangement shown in FIG. 1.
Figure 3:
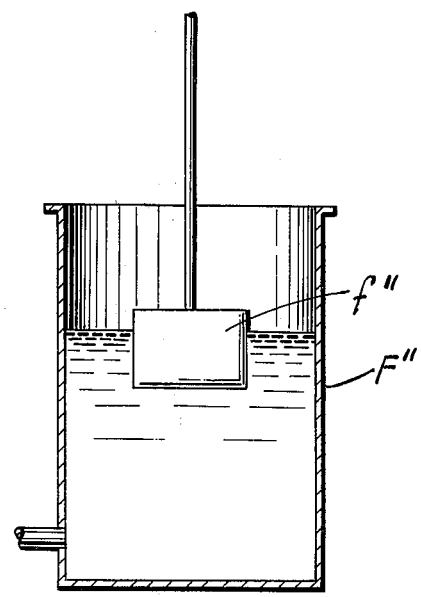
FIG. 3 is a cross-sectional view of another regulator for the arrangement shown in FIG. 1.

The regulator F can be of any type. As represented it can consist of a cylinder the movable piston of which controls the connection T and is subject to the pressure prevailing in the circuit. The regulator F can also comprise a deformable diaphragm $f'$ within a casing $F'$, as shown in FIG. 2, subject to the pressure prevailing in the circuit, or a float $f''$ of an equilibration chamber $F''$, note FIG. 3 following the level of the liquid in the regulator, this level being established as a function of the pressure prevailing in the circuit.

The operation of the device is as follows.

At any moment, the first pump C, operating as a quantity regulator, delivers the quantity of liquid which must be distributed, owing to the adjustment of the pin L which cooperates with that of the holes J which corresponds to the quantity of liquid to be distributed per unit aera.

If the quantity of liquid actually distributed through the boom K is equal to that chosen, i.e. if it is equal to the delivery of the pump C, the inner operative volume of the regulator F and the pressure in the circuit remain constant. The return value G remains in its position, due to the controlling action of the regulator F which is immobile, whereby said valve is traversed by the part of the pump H delivery corresponding to the excess of the pump H delivery over the pump C delivery.

This occurs if the wheel A and the pump H have each constant speed or if the speed of the wheel A and the delivery of the pump H vary proportionally, which is the case for example when the pump H is of the piston type and is driven by the motor which moves the vehicle.

If the quantity of liquid actually distributed through the boom K becomes greater than that initially chosen, i.e. if it becomes greater than that delivered by the pump C, the inner operative volume of the regulator F decreases, the part of the pump H delivery returning into the supplying conduct through the valve G increases, due to the controlling action of the regulator F, and the quantity of liquid distributed by the circuit through the boom K decreases until it is again equal to the exact delivery of the pump C.

This occurs when the wheel A speed decreases and when, simultaneously, the pump H delivery either remains constant, which is the case when the pump H is driven by an auxiliary motor, or decreases with a quantity less than proportional to the speed variation of the vehicle, or even increases, which is the case when the pump H is driven by the vehicle motor and when the vehicle skids or when the driver uses a shorter ratio in the gearbox.

This also occurs when the wheel A speed increases and when, simultaneously, the pump H delivery increases with a quantity more than proportional to the speed variation of the vehicle, which can be the case with centrifugal pumps or roller pumps or occurs when the driving vehicle skids.

This occurs at last when the wheel A speed remains constant and when, simultaneously, the pump H delivery increases, which is the case if the driving vehicle skids and/or if the driver uses a shorter ratio in the gearbox.

Conversely, if the quantity of liquid actually distributed through the boom K becomes smaller than that initially chosen, i.e if it becomes smaller than that delivered by the pumps C, the inner operative volume of the regulator F increases, the part of the pump H delivery returning into the supplying conduct through the valve G decreases, due to the controlling action of the regulator F, and the quantity of liquid distributed through the boom K increases until it is again equal to the exact delivery of the pump C.

This occurs when the wheel A speed decreases and when, simultaneously, the pump H delivery decreases with a quantity more than proportional to the speed variation of the vehicle, which can be the case with centrifugal pumps or roller pump.

This also occurs when the wheel A speed increases and when, simultaneously, the pump H delivery either remains constant, which is the case with an auxiliary driven motor pump, or increases with a quantity less than proportional to the speed variation of the vehicle, which can be the case with centrifugal or roller pumps, or decreases, which is the case when the driver uses a longer ratio in the gearbox.

This occurs at last when the wheel A speed remains constant and when, simultaneously, the pump H delivery decreases, which is the case when the driver uses a longer ratio in the gearbox.

It will be understood that various actions can occur at the same time. They are automatically counterbalanced by the device according to the present invention the purpose of which is permit at any moment to the pump H to distribute through the boom K the quantity of liquid delivered by the pump C.

This device permits therefore to make the delivery through the boom K subject to the speed of displacement of the vehicle, irrespective of the rotation speed of the pump H and of the eventual skidding of the driving vehicle, so that the volume of distributed liquid per unit of area is constant.

The device according to the invention can be utilised in all cases where there are variations of relative speed between an atomiser or distributor nozzle and the surface to be treated, in particular for agricultural sprayers, roller sprayers or sprayers for paper or cloth webs.

What I claim is:

1. A device for the controlled metering of a liquid from a reservoir and for discharging the liquid onto a surface relative to which the device moves, comprising a distributor outlet member for discharging the liquid onto the surface, a flow circuit connecting said reservoir to said distributor outlet member, a first metering pump positioned in said circuit for withdrawing liquid from said reservoir and for discharging the liquid into the circuit downstream of said metering pump, said metering pump operating at a first pressure, first driving means adjustably connected to said metering pump for varying the amount of liquid discharged by said pump, said first driving means arranged to cooperate with the surface onto which the liquid is discharged and relative to which the device moves for establishing the delivery rate of said metering pump proportional to the relative speed between the device and the surface relative to which it travels, a second pump positioned in said circuit between said first pump and said distributor outlet member, said second pump operating at a second pressure higher than the operating pressure of said first pump, second driving means for said second pump, said second driving means operated independently of and by a different source from said first driving means, a regulating return valve connected to said circuit in parallel with said second pump, and a pressure sensitive device connected to said circuit downstream from said first pump and upstream from the parallel connection of said second pump and regulating return valve, said pressure sensitive device is coupled to said regulating return valve for controlling said return valve so that the portion of flow through said second pump which passes through said return valve increases or decreases in response to a decrease or increase in the pressure in said circuit, the pressure in said circuit is dependent on the quantity of liquid supplied into said circuit from said first pump and the actual quantity of liquid distributed through said distributor outlet member.

2. A device according to claim 1, wherein said pressure sensitive device comprises a movable piston subject to the pressure prevailing in the said circuit.

3. A device according to claim 1, wherein said pressure sensitive device comprises a diaphragm subject to the pressure prevailing in the said circuit.

4. A device according to claim 1, wherein the said pressure sensitive device comprises an equilibration chamber and a flot therein which follows the level of the liquid in said chamber.

5. A device according to claim 1 wherein the pressure sensitive device is connected mechanically to the regulating valve.

6. A device according to claim 1, wherein said first driving means for said first pump comprises a non-driving wheel of an agricultural distributor vehicle and said second driving means for said second pump comprises a power take-off of the motor which moves the vehicle.

7. A device according to claim 1, wherein said first driving means for said first pump comprises a non-driving wheel of an agricultural distributor vehicle and said second driving means for said second pump comprises a power take-off of an auxiliary motor.

* * * * *